United States Patent
Igarashi et al.

(10) Patent No.: US 10,397,566 B2
(45) Date of Patent: Aug. 27, 2019

(54) IMAGE CODING APPARATUS, IMAGE CODING METHOD, AND PROGRAM

(71) Applicant: CANON KABUSHIKI KAISHA, Tokyo (JP)

(72) Inventors: Susumu Igarashi, Kawasaki (JP); Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/956,222

(22) Filed: Apr. 18, 2018

(65) Prior Publication Data

US 2018/0316915 A1 Nov. 1, 2018

(30) Foreign Application Priority Data

Apr. 27, 2017 (JP) ................. 2017-088532

(51) Int. Cl.
*H04N 19/105* (2014.01)
*H04N 19/122* (2014.01)
*H04N 19/176* (2014.01)
*H04N 19/14* (2014.01)
*H04N 19/89* (2014.01)
*H04N 19/119* (2014.01)
*H04N 19/11* (2014.01)
*H04N 19/157* (2014.01)

(52) U.S. Cl.
CPC ........... *H04N 19/105* (2014.11); *H04N 19/11* (2014.11); *H04N 19/119* (2014.11); *H04N 19/122* (2014.11); *H04N 19/14* (2014.11); *H04N 19/157* (2014.11); *H04N 19/176* (2014.11); *H04N 19/89* (2014.11)

(58) Field of Classification Search
CPC .................................................. H04N 19/105

USPC ..................................................... 375/240.12
See application file for complete search history.

(56) References Cited

U.S. PATENT DOCUMENTS

2015/0264351 A1* 9/2015 Miyoshi ............... H04N 19/107
  375/240.13
2016/0182904 A1* 6/2016 Watanabe ............ H04N 19/176
  375/240.12

FOREIGN PATENT DOCUMENTS

JP 2014-140169 A 7/2014

OTHER PUBLICATIONS

"High efficiency video coding", ITU-T H. 265, Series H: Audiovisual and Multimedia Systems, Infrastructure of audiovisual services—Coding of moving video, Telecommunication Standardization Sector of ITU, Apr. 2013.

* cited by examiner

Primary Examiner — Yulin Sun
(74) Attorney, Agent, or Firm — Canon U.S.A., Inc. IP Division

(57) ABSTRACT

An image coding apparatus which codes an image using intra prediction determines a size of a prediction block to be a unit of processing for performing intra prediction. The image coding apparatus derives a prediction error by performing intra prediction on the prediction block, derives a coding cost of a prediction mode when performing the intra prediction using a reference according to the determined size, and determines the coding cost of the prediction mode based on the coding cost of the prediction mode and the prediction error. The image coding apparatus determines a prediction mode of the prediction block from among a plurality of prediction modes based on the coding cost.

14 Claims, 10 Drawing Sheets

| PREDICTION MODE \ BLOCK SIZE | 4 × 4 | 8 × 8 | 16 × 16 | 32 × 32 | 64 × 64 |
|---|---|---|---|---|---|
| 0 (PREDICTION MODE EQUAL TO ADJACENT BLOCK) | 28 | 26 | 24 | 22 | 20 |
| 1 (PLANAR PREDICTION) | 32 | 48 | 48 | 48 | 48 |
| 2 (DC PREDICTION) | 32 | 48 | 48 | 48 | 48 |
| 3 (VERTICAL OR ANGULAR 26 PREDICTION) | 48 | 64 | 64 | 64 | 64 |
| 4 (HORIZONTAL OR ANGULAR 10 PREDICTION) | 96 | 96 | 96 | 96 | 96 |
| 5 (ANGULAR 2 PREDICTION) | 96 | 96 | 96 | 96 | 96 |
| 6 (ANGULAR 18 PREDICTION) | 96 | 96 | 96 | 96 | 96 |
| 7 (ANGULAR 34 PREDICTION) | 96 | 96 | 96 | 96 | 96 |

FIG.7B

| PREDICTION MODE \ BLOCK SIZE | 4 × 4 | 8 × 8 | 16 × 16 | 32 × 32 | 64 × 64 |
|---|---|---|---|---|---|
| 0 (PREDICTION MODE EQUAL TO ADJACENT BLOCK) | 16 | 16 | 16 | 16 | 16 |
| 1 (PLANAR PREDICTION) | 32 | 32 | 32 | 32 | 48 |
| 2 (DC PREDICTION) | 32 | 32 | 32 | 48 | 48 |
| 3 (VERTICAL OR ANGULAR 26 PREDICTION) | 48 | 48 | 64 | 64 | 64 |
| 4 (HORIZONTAL OR ANGULAR 10 PREDICTION) | 48 | 48 | 64 | 64 | 96 |
| 5 (ANGULAR 2 PREDICTION) | 48 | 48 | 64 | 96 | 96 |
| 6 (ANGULAR 18 PREDICTION) | 64 | 64 | 96 | 96 | 96 |
| 7 (ANGULAR 34 PREDICTION) | 64 | 96 | 96 | 96 | 96 |

IMAGE CODING APPARATUS, IMAGE CODING METHOD, AND PROGRAM

BACKGROUND OF THE INVENTION

Field of the Invention

The present disclosure relates to an image coding apparatus, an image coding method, and a program.

Description of the Related Art

Conventionally, H.264/Moving Picture Experts Group 4 advanced video coding (H.264/MPEG-4 AVC, hereinbelow, H.264) is known as a coding system of a compressed record of a moving image. In addition, High Efficiency Video Coding system (hereinbelow, HEVC) is known as a successor system of H.264 and further highly efficient international standard coding system (see ITU-T H.265 (April 2013), High efficiency video coding). Additionally, HEVC Software is open to the public on the following uniform resource locator (URL): <https://hevc.hhi.fraunhofer.de/svn/svn_HEVCSoftware/>). HEVC has adopted intra prediction coding to improve coding efficiency in which a prediction error is coded by performing in-screen prediction (hereinbelow, referred to as intra prediction) using correlation between pixels in a screen. The intra prediction is performed based on a size of a prediction block (hereinbelow, a prediction block size) which is a unit of prediction.

In H.264, three types of sizes, namely four pixels in a horizontal direction by four pixels in a vertical direction (hereinbelow, referred to as 4*4 pixels), 8*8 pixels, and 16*16 pixels can be selected as the prediction block size. Further, in H.264, different prediction block sizes cannot be mixed in a macro block which is a unit of coding.

In HEVC, five types of sizes, namely 4*4 pixels, 8*8 pixels, 16*16 pixels, 32*32 pixels, and 64*64 pixels can be used as the prediction block size. Further, in HEVC, different prediction block sizes can be mixedly used in a Coding Tree Unit (hereinbelow, CTU) which is a block unit of coding. Furthermore, 35 modes are defined to each of the prediction block sizes as intra prediction modes of a luminance component of an image (hereinbelow, the luminance intra prediction modes). When the intra prediction coding is performed in HEVC, if an optimum prediction block size and an optimum luminance intra prediction mode are not selected from 5 types of the prediction block sizes and 35 pieces of the luminance intra prediction modes, a prediction error becomes large, and coding efficiency is deteriorated.

In addition, an enormous amount of calculation is performed in a method for determining the prediction block size in the HEVC Software (HEVC Software [Online], [searched in Apr. 10, 2017], Internet: <https://hevc.hhi.fraunhofer.de/svn/svn_HEVCSoftware/>, hereinbelow, HM). It is because a coding cost is calculated for all combinations of a luminance intra prediction mode and a color difference intra prediction mode in each of the prediction block sizes. Thus, there is an issue that when a coding target image has high resolution, coding in real time is difficult. In contrast, Japanese Patent Application Laid-Open No. 2014-140169 describes a method for determining a prediction block size according to a degree of flatness of an image and determining a prediction mode based on the determined block size.

SUMMARY OF THE INVENTION

An apparatus includes, for example, a following configuration for improving efficiency of image coding processing. More specifically, an image coding apparatus which codes an image using intra prediction includes a size determination unit configured to determine a size of a prediction block to be a unit of processing for performing intra prediction, an intra prediction unit configured to derive a prediction error by performing intra prediction on the prediction block, a cost determination unit configured to derive a coding cost of a prediction mode in a case where the intra prediction is performed using a reference according to the size determined by the size determination unit and determine the coding cost of the prediction mode based on the coding cost of the prediction mode and the prediction error, and a mode determination unit configured to determine a prediction mode of the prediction block from among a plurality of prediction modes based on the coding cost.

An apparatus includes, for example, a following configuration. More specifically, an image coding apparatus which codes an image using intra prediction includes a size determination unit configured to determine a size of a prediction block to be a unit of processing for performing intra prediction, an intra prediction unit configured to derive a prediction error by performing intra prediction on the prediction block, a complexity specifying unit configured to specify complexity of the prediction block having the block size determined by the size determination unit, a cost determination unit configured to derive a coding cost of a prediction mode in a case where the intra prediction is performed using a reference according to the complexity determined by the complexity specifying unit and determine the coding cost of the prediction mode based on the coding cost of the prediction mode and the prediction error, and a mode determination unit configured to determine a prediction mode of the prediction block from among a plurality of prediction modes based on the coding cost.

Further features of the present disclosure will become apparent from the following description of exemplary embodiments with reference to the attached drawings.

DESCRIPTION OF THE EMBODIMENTS

Various exemplary embodiments of the present disclosure will be described in detail below with reference to the attached drawings.

Figure 1:
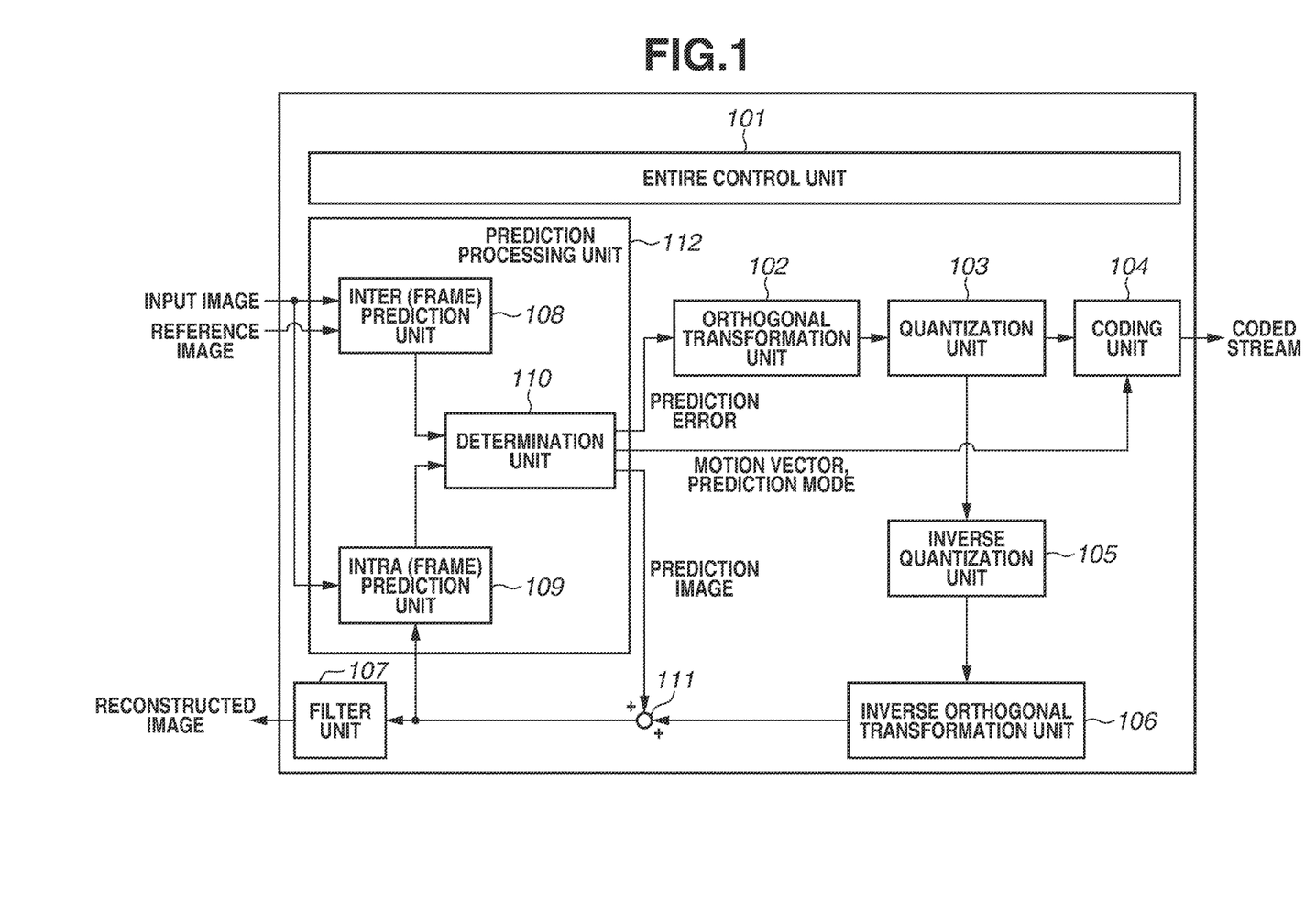
FIG. 1 is a functional block diagram illustrating a moving image coding apparatus.

FIG. 1 is a functional block diagram illustrating a moving image coding apparatus 100 according to a first exemplary embodiment. The moving image coding apparatus 100 can perform intra prediction coding and inter prediction coding in a unit of block selected (determined) from a plurality of different sizes. The moving image coding apparatus 100 includes an entire control unit 101, an orthogonal transformation unit 102, a quantization unit 103, and a coding unit 104. The moving image coding apparatus 100 further includes an inverse quantization unit 105, an inverse orthogonal transformation unit 106, a filter unit 107, an inter prediction unit 108, an intra prediction unit 109, a determination unit 110, and an adder 111.

An input image (an input frame) input to the moving image coding apparatus 100 is input to the inter prediction unit 108 and the intra prediction unit 109. The inter prediction unit 108 performs inter prediction processing on the input image using a reference image (a reference frame) and outputs prediction results (a prediction error, motion vector information, a block size, a coding cost, and the like) to the determination unit 110. The intra prediction unit 109 performs intra prediction processing on the input image (the input frame) and outputs prediction results (a prediction error, a prediction mode, a block size, a coding cost, and the like) to the determination unit 110.

The determination unit 110 compares a coding cost of the inter prediction with a coding cost of the intra prediction and outputs the prediction error and block size information of either one of the inter prediction and the intra prediction to the orthogonal transformation unit 102. When the inter prediction is selected, the determination unit 110 further outputs a motion vector and an inter prediction image respectively to the coding unit 104 and the adder 111. When the intra prediction is selected, the determination unit 110 outputs the prediction mode and an intra prediction image respectively to the coding unit 104 and the adder 111.

The orthogonal transformation unit 102 performs orthogonal transform on the prediction error and outputs a transform coefficient to the quantization unit 103. The quantization unit 103 quantizes the transform coefficient and outputs a transform quantization coefficient to the coding unit 104. The coding unit 104 respectively performs coding on the prediction mode, the motion vector, and the transform quantization coefficient input from the determination unit 110 and outputs as a coded stream. The transform quantization coefficient is subjected to inverse quantization and inverse orthogonal transform respectively in the inverse quantization unit 105 and in the inverse orthogonal transformation unit 106 and thus is restored to the prediction error. The restored prediction error is input to the adder 111. The adder 111 generates a reconstructed image by adding the restored prediction error to a prediction image from a prediction processing unit 112 and outputs the reconstructed image to the filter unit 107 and the intra prediction unit 109. The filter unit 107 performs filter processing on the reconstructed image from the adder 111, outputs as the reconstructed image to be used for the inter prediction, and stores the reconstructed image in a storage unit, which is not illustrated. Each unit is controlled via a control signal (not illustrated) from the entire control unit 101.

Figure 2:
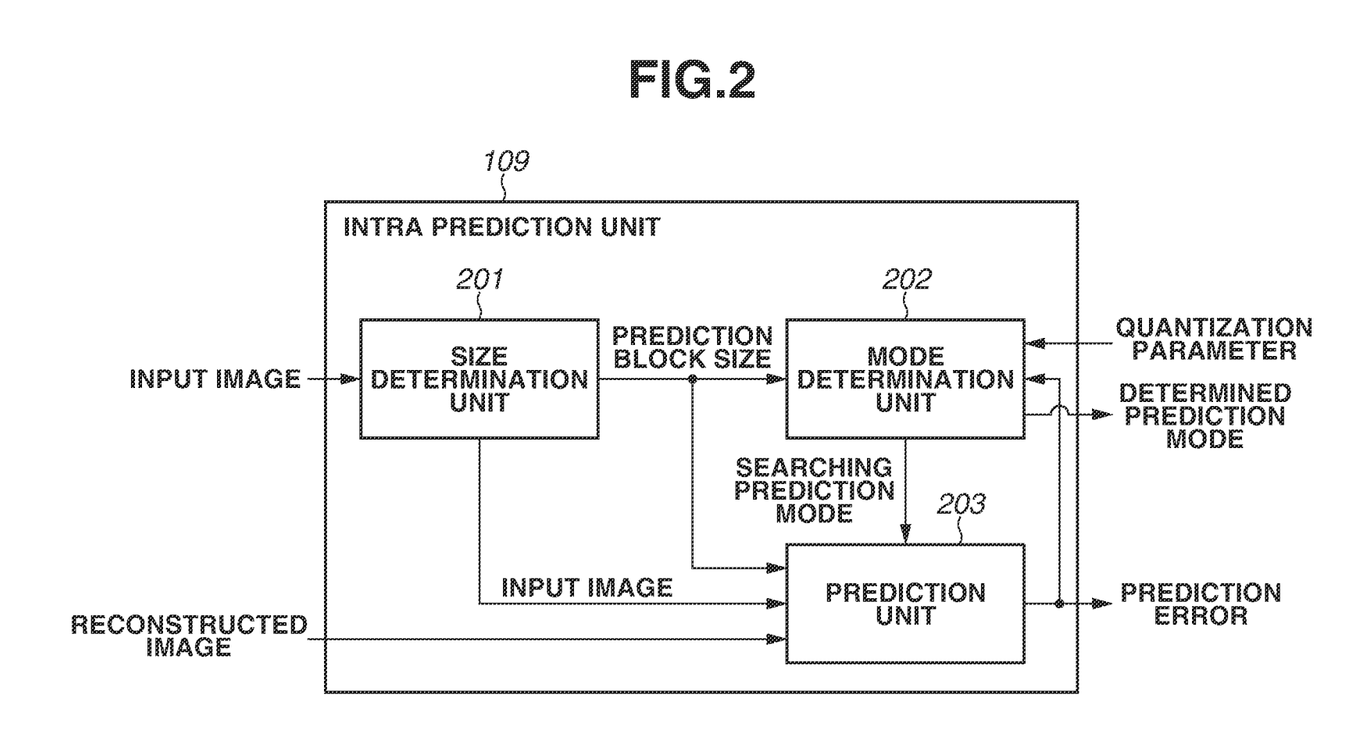
FIG. 2 is a functional block diagram illustrating an intra prediction unit.

FIG. 2 is a functional block diagram illustrating the intra prediction unit 109. The intra prediction unit 109 includes a size determination unit 201, a mode determination unit 202, and a prediction unit 203. The size determination unit 201 captures an image by the CTU and calculates a feature amount of each sub-block in the CTU. The size determination unit 201 determines a prediction block size in each hierarchy according to a preliminarily defined prediction block size structure which is expressed by a tree-shaped hierarchical structure in the CTU based on the feature amount. The prediction block is a block having a size which is a unit of processing when the intra prediction is performed. In addition, a prediction block size is a size of a prediction block. The prediction block size is less than or equal to a block size of the CTU and greater than or equal to a size of the sub-block. A block size determination method by the size determination unit 201 is described in detail below.

The mode determination unit 202 determines a prediction mode of a processing target CTU using a quantization parameter and the prediction error output from the prediction unit 203 as inputs and based on the prediction block size determined by the size determination unit 201. The prediction unit 203 performs prediction processing on a processing target image based on the prediction block size determined by the size determination unit 201 and the prediction mode determined by the mode determination unit 202. At this time, the prediction unit 203 uses the reconstructed image of the already coded image as a prediction value. Further, the prediction unit 203 calculates an error between the prediction value and the processing target image and outputs the error as a prediction error value.

Figure 3:
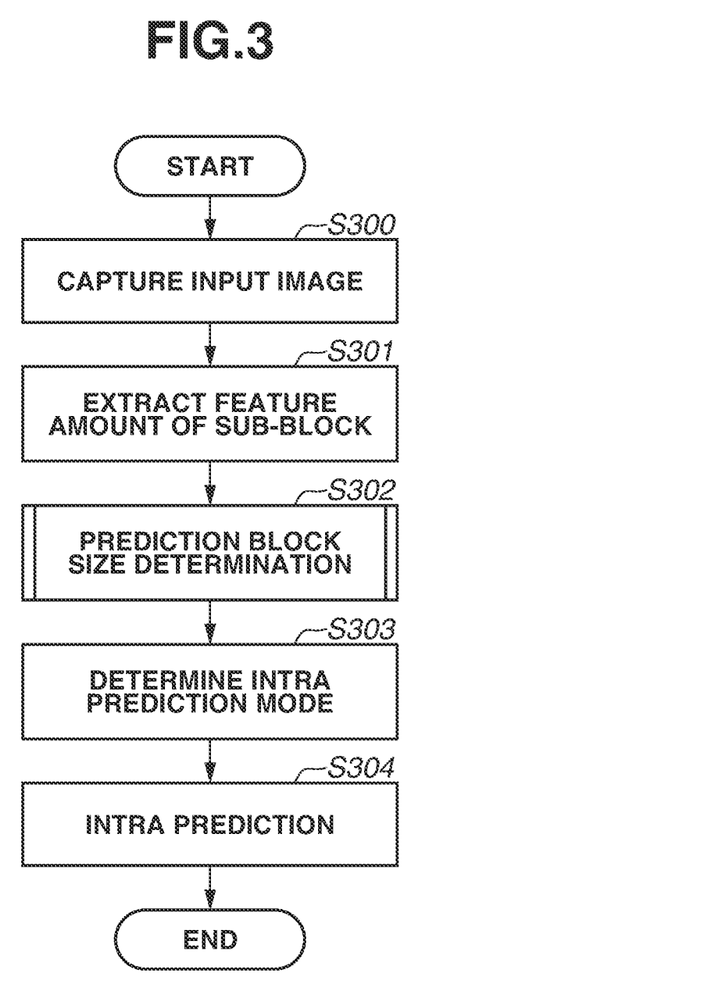
FIG. 3 is a flowchart illustrating intra prediction processing.

FIG. 3 is a flowchart illustrating intra prediction processing by the intra prediction unit 109. First, in step S300, the size determination unit 201 captures an input image (an original image) by the CTU. Next, in step S301, the size determination unit 201 reads one sub-block as a processing target from the CTU captured in step S300. The size determination unit 201 extracts a feature amount of the processing target sub-block. According to the present exemplary embodiment, the size determination unit 201 uses an activity which is one of index values indicating complexity of the processing target sub-block as a feature amount. An activity is expressed by a sum of absolute differences between a luminance value of each pixel belonging to a calculation target block and an average value of the luminance values of the relevant block, and it can be considered that the complexity is higher as the activity value is larger. The feature amount may be any value as long as it is effective to determine the prediction block size in the intra prediction and is not limited to the one described in the present exemplary embodiment. Other examples of the feature amount may include variance of luminance and an activity and variance of color difference.

Figure 4:
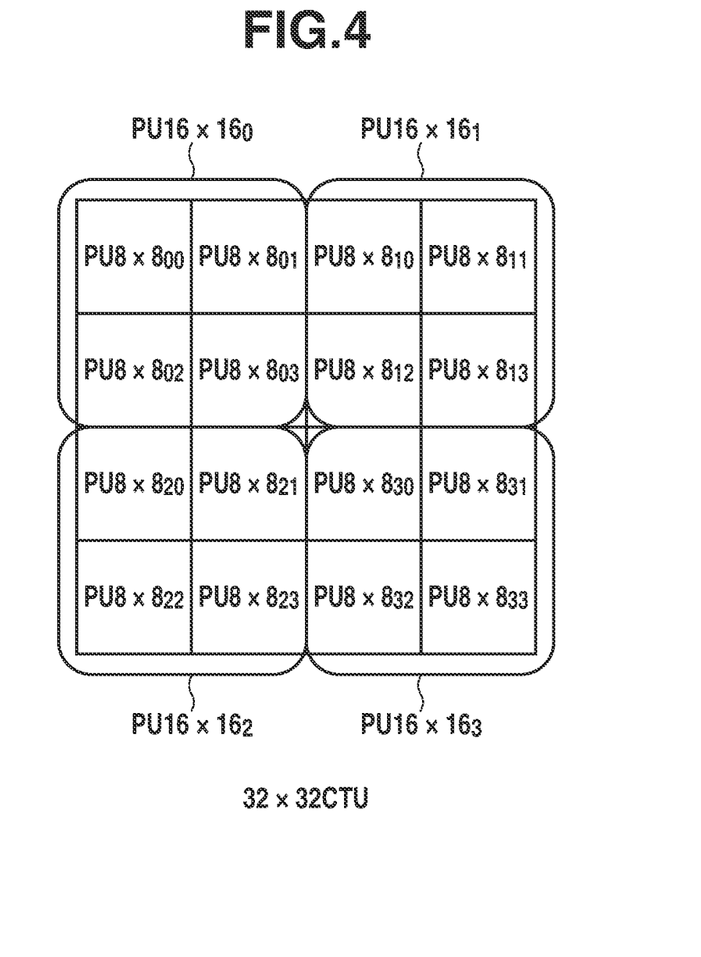
FIG. 4 illustrates pixel blocks.

Next, in step S302, the size determination unit 201 determines the prediction block size regarding the processing target CTU based on the feature amount of the sub-block obtained in step S301. The present processing is an example of size determination processing. The prediction block size determination processing (in step S302) of the CTU is described. According to the present exemplary embodiment, a case when the CTU size is 32*32 pixels is described as an example. FIG. 4 illustrates a relationship of 8*8 pixel blocks and 16*16 pixel blocks belonging to the 32*32 size CTU. In FIG. 4, a prediction block is expressed as a Prediction Unit (PU). According to the present exemplary embodiment, an 8*8 pixel block is expressed as PU $8*8_{ij}$ (i=0, 1, 2, 3; j=0, 1, 2, 3), and a 16*16 pixel block is expressed as PU $16*16_i$ (i=0, 1, 2, 3). As illustrated in FIG. 4, a 32*32 pixel block is constituted of four pieces of 16*16 pixel blocks (PU $16*16_1$ to PU $16*16_3$). Further, each 16*16 pixel block PU $16*16_i$ (i=0, 1, 2, 3) is constituted of four pieces of 8*8 pixel blocks (PU $8*8_{i0}$ to PU $8*8_{i3}$).

The size determination unit 201 includes a register for storing flags corresponding to the 32*32 CTU and each PU belonging thereto as block size information. The flag is constituted of a non-PU 32 flag, a non-PU 16 flag [i] (i=0, 1, 2, 3), and a non-PU 8 flag [ij] (i=0, 1, 2, 3; j=0, 1, 2, 3). The non-PU 32 flag stores information of whether a PU size of the 32*32 pixel block is set to a 32*32 size. According to the present exemplary embodiment, a meaning of a flag value is defined as zero (0) when the block is set to the 32*32 size and as one (1) otherwise.

The non-PU 16 flag [i] (i=0, 1, 2, 3) corresponds to PU 16*16$_i$ illustrated in FIG. 4 and stores information of whether these 16*16 pixel blocks are set to a 16*16 size. According to the present exemplary embodiment, a meaning of a flag value is defined as zero (0) when the block is set to the 16*16 size and as one (1) otherwise. Further, the non-PU 8 flag [ij] (i=0, 1, 2, 3; j=0, 1, 2, 3) corresponds to PU 8*8$_{ij}$ illustrated in FIG. 4 and stores information of whether these 8*8 pixel blocks are set to an 8*8 size. According to the present exemplary embodiment, a meaning of a flag value is defined as zero (0) when the block is set to the 8*8 size, and one (1) when the block is divided into a 4*4 size.

Figure 5:
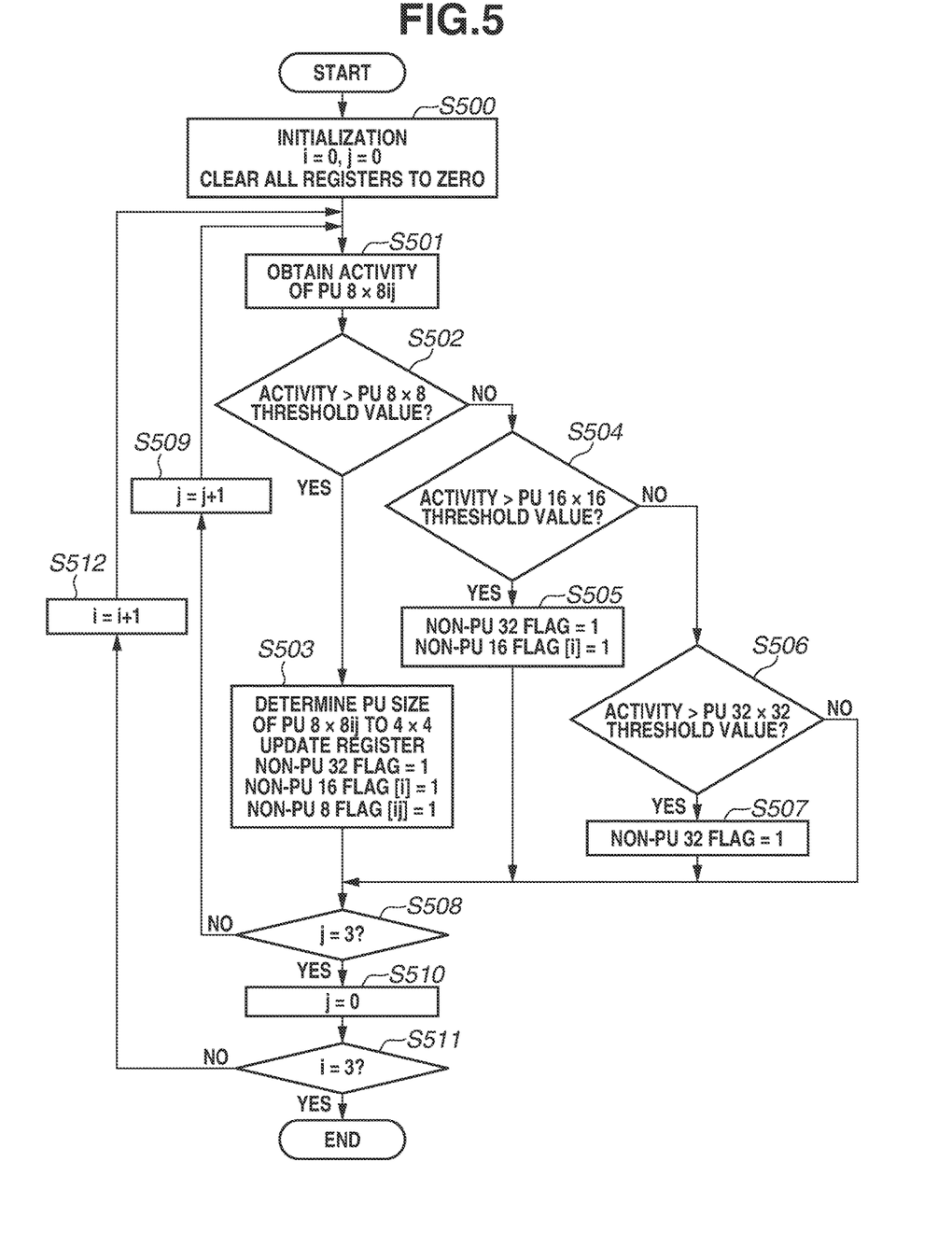
FIG. 5 is a flowchart illustrating prediction block size determination processing.

FIG. 5 is a flowchart illustrating detail processing in the prediction block size determination processing (in step S302). First, in step S500, the size determination unit 201 performs initialization processing on each CTU. The size determination unit 201 clears all of the registers storing the non-PU 32 flag, the non-PU 16 flag [i], and the non-PU 8 flag [ij] to zero. Further, the size determination unit 201 also clears variables i and j to zero. Next, in step S501, the size determination unit 201 obtains an activity value of an 8*8 pixel block PU 8*8$_{ij}$ to be used as the sub-block. Next, in step S502, the size determination unit 201 compares the activity value obtained in step S501 with a predetermined PU 8*8 threshold value.

Generally, when an activity value is low, a change of a pixel value in a block is considered as small, so that it can be considered that there is no need to finely set a unit for performing the intra prediction. For example, there is almost no change of a pixel value in an area such as an empty area and a wall without pattern in a screen, and thus prediction accuracy is high in such areas regardless of a unit size of the intra prediction. Therefore, it is advantageous to set an intra prediction unit size large since an associated information amount other than the prediction error is small. On the other hand, when a change of the pixel value is relatively large, it is advantageous to more finely set a unit of intra prediction.

When the activity value is larger than the PU 8*8 threshold value (YES in step S502), the size determination unit 201 advances the processing to step S503. When the activity value is less than or equal to the PU 8*8 threshold value (NO in step S502), the size determination unit 201 advances the processing to step S504. In step S503, the size determination unit 201 determines the PU size of the 8*8 pixel block PU 8*8$_{ij}$ as the processing target to a 4*4 size. As described above, the size determination unit 201 sets a relatively small prediction block size by assuming that a case where the activity value is larger than the PU 8*8 threshold value corresponds to a case where the change of the pixel value is relatively large in the processing target 8*8 pixel block.

Further, in step S503, the size determination unit 201 updates the related non-PU 8 flag [ij] with one. The size determination unit 201 updates the non-PU 16 flag [i] corresponding to the 16*16 pixel block PU 16*16$_i$ with one according to determining the prediction block size of the processing target 8*8 pixel block as the 4*4 size in step S503. This is because the prediction block size of the high-order hierarchical block PU 16*16$_i$ to which the 8*8 pixel block PU 8*8$_{ij}$ belongs never becomes the 16*16 size. The size determination unit 201 updates the non-PU 32 flag with one in a similar manner. This is because the prediction block size of the 32*32 CTU also never becomes the 32*32 size.

In step S504, the size determination unit 201 compares the activity value of the 8*8 pixel block PU 8*8$_{ij}$ with a predetermined PU 16*16 threshold value. Regarding the prediction block size of the high-order hierarchical block PU 16*16$_i$, the size determination unit 201 compares activities of all of the 8*8 pixel blocks PU 8*8$_{i0}$ to PU 8*8$_{i3}$ belonging to the block PU 16*16$_i$ with the PU 16*16 threshold value. Subsequently, the size determination unit 201 determines the prediction block size as the 16*16 size only when all of the activities of the 8*8 pixel blocks belonging to the block PU 16*16$_i$ are less than or equal to the PU 16*16 threshold value. When the activity value is larger than the PU 16*16 threshold value (YES in step S504), the size determination unit 201 advances the processing to step S505. When a comparison result is YES in step S504, it is desirable that the prediction block size of the high-order hierarchical block PU 16*16$_i$ to which the 8*8 pixel block PU 8*8$_{ij}$ belongs has a smaller value than the 16*16 size.

In step S505, the size determination unit 201 updates the non-PU 16 flag [i] corresponding to the 16*16 pixel block PU 16*16 with one. In addition, the prediction unit block size of the 32*32 CTU never becomes the 32*32 size, so that the size determination unit 201 updates the non-PU 32 flag with one. After performing the processing in step S505, the size determination unit 201 advances the processing to step S508. When the activity value is less than or equal to the PU 16*16 threshold value (NO in step S504), the size determination unit 201 advances the processing to step S506.

In step S506, the size determination unit 201 compares the activity value of the 8*8 pixel block PU 8*8$_{ij}$ with a predetermined PU 32*32 threshold value. Regarding the intra prediction unit size of the 32*32 CTU, the size determination unit 201 compares the feature amounts of all of the 8*8 pixel blocks PU 8*8$_{i0}$ to PU 8*8$_{i3}$ belonging to the 32*32 CTU with the PU 32*32 threshold value. Subsequently, the size determination unit 201 determines the prediction block size as the 32*32 size only when all of the activities of the 8*8 pixel blocks belonging to the 32*32 CTU are less than or equal to the PU 32*32 threshold value.

When the activity value is larger than the PU 32*32 threshold value (YES in step S506), the size determination unit 201 advances the processing to step S507. When a comparison result is YES in step S506, it is desirable that the intra prediction unit size of the 32*32 CTU has a smaller value than the 32*32 size. In step S507, the size determination unit 201 updates the non-PU 32 flag corresponding to the 32*32 CTU with one and then advances the processing to step S508. When the activity value is less than or equal to the PU 32*32 threshold value (NO in step S506), the size determination unit 201 advances the processing to step S508.

In step S508, the size determination unit 201 determines whether the variable j is equal to three. When the variable j is equal to three (YES in step S508), the size determination unit 201 advances the processing to step S510. When the variable j is not equal to three (NO in step S508), the size determination unit 201 advances the processing to step S509. In step S509, the size determination unit 201 increments a value of the variable j and then advances the processing to step S501. As described above, the size determination unit 201 sequentially scans the 8*8 pixel blocks belonging to the one 16*16 pixel block PU **16*16**$_i$ and performs the processing described in steps S501 to step S507 on all of the 8*8 pixel blocks PU **8*8$_{i0}$ to PU 8*8**$_{i3}$.

In step S510, the size determination unit 201 clears the variable j to zero and then advances the processing to step S511. In step S511, the size determination unit 201 confirms whether the variable i is equal to three. When the variable i is equal to three (YES in step S511), the size determination unit 201 terminates the prediction block size determination processing. When the variable i is not equal to three (NO in step S511), the size determination unit 201 advances the processing to step S512. In step S512, the size determination unit 201 increments a value of the variable i and then advances the processing to step S501. As described above, the size determination unit 201 sequentially scans the 16*16 pixel blocks belonging to the 32*32 CTU and performs the processing described in steps S501 to S510 on all of the 16*16 pixel blocks PU **16*16$_0$ to PU 16*16$_3$. According to the present exemplary embodiment, the example is described in which the predetermined values are used as the PU 8*8 threshold value, the PU 16*16 threshold value, and the PU 32*32** threshold value, however, the present exemplary embodiment is not limited to this example.

Generally, in a flat portion of an image, the prediction error of the image can be sufficiently reduced, and the bit number which is required for a coding parameter such as prediction mode information can be also reduced even if a large prediction block size is used, so that it is desirable to select a large prediction block size. On the other hand, in a complex portion of an image, the prediction error of the image cannot be reduced unless prediction is finely performed by reducing the block size in many cases, so that it is desirable to reduce the prediction block size. In contrast, the moving image coding apparatus 100 according to the present exemplary embodiment can determine a relatively large prediction block size to a flat portion and a relatively small prediction block size to a complex portion of an image as described above. In addition, the moving image coding apparatus 100 can reduce a calculation amount for calculating a coding cost by performing the prediction mode search after determining the block size which is described below.

Returning to FIG. 3, after the processing in step S302, in step S303, the mode determination unit 202 determines an intra prediction mode of the processing target CTU for each block based on a quantization parameter and the block size information indicating the prediction block size determined in step S302. At this time, the mode determination unit 202 calculates the prediction errors in respective cases in which prediction is performed in each mode of 35 types of the luminance intra prediction modes and 5 types of the color difference intra prediction modes corresponding to the prediction block size set for each block. Further, the mode determination unit 202 searches for an optimum prediction mode based on the calculation result.

A prediction mode search algorithm which is used when the mode determination unit 202 determines the prediction mode is not particularly limited. The mode determination unit 202 may perform a search by covering all modes or omitting a specific mode in the luminance intra prediction mode search and the color difference intra prediction mode search. In addition, the mode determination unit 202 may select the prediction mode same as the prediction mode searched for luminance without performing the color difference intra prediction mode search.

Further, the mode determination unit 202 outputs the searching prediction mode to the prediction unit 203. The prediction unit 203 performs the intra prediction according to the prediction mode and calculates the prediction error. The mode determination unit 202 receives the corresponding prediction error from the prediction unit 203 and calculates a coding cost in the searching prediction mode. Subsequently, the mode determination unit 202 determines a next searching prediction mode by comparing the determined coding cost with the coding cost of the prediction mode searched in the past and outputs the next searching prediction mode to the prediction unit 203. The mode determination unit 202 repeats the processing and determines the optimum prediction mode. In addition, the mode determination unit 202 performs the processing on each block in the processing target CTU and thus determines the prediction mode of each divided block in the processing target CTU.

Figure 6:
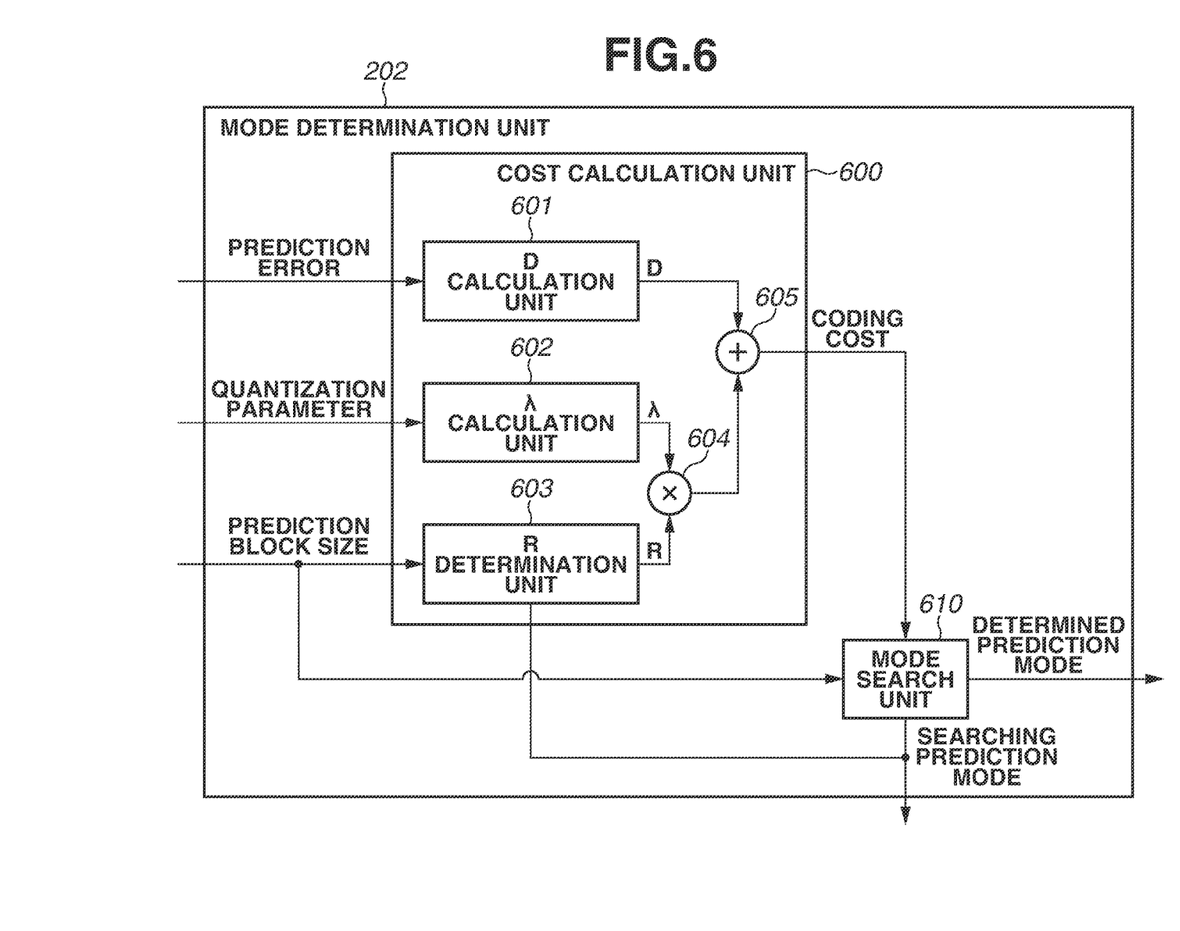
FIG. 6 is a functional block diagram illustrating a mode determination unit.

FIG. 6 is a functional block diagram illustrating the mode determination unit 202. The mode determination unit 202 includes a cost calculation unit 600 and a mode search unit 610. The cost calculation unit 600 calculates and outputs a coding cost of the corresponding block with use of the block size information, the quantization parameter, the prediction error, and the searching prediction mode information as inputs. Generally, the coding cost is calculated using a function of $D+\lambda*R$ in many cases, so that the coding cost is calculated for each of the searching prediction modes, and the prediction mode having the minimum coding cost is selected.

According to the present exemplary embodiment, the cost calculation unit 600 calculates the coding cost using the function of $D+\lambda*R$. A D value is a distortion amount obtained from a difference between an input image and a prediction image, and according to the present exemplary embodiment, a sum of absolute differences (SAD) of the prediction error is used as the D value. The D value is not limited to the SAD and may be a sum of absolute transformed differences (SAID) obtained by performing Hadamard transform on the prediction error, a sum of squared difference (SSD), and the like. A $\lambda$ value is a coefficient for adjusting a ratio of the distortion amount and a code amount of the prediction mode and calculated based on the quantization parameter. A ratio of a code amount of an image itself and the code amount of the prediction mode varies depending on the quantization parameter, thus the ratio is expressed by the $\lambda$ value. An R value is a code amount necessary for coding the prediction mode and calculated according to the block size information and the searching prediction mode information according to the present exemplary embodiment.

The mode search unit 610 successively determines the prediction mode to be searched with use of the block size information and the coding cost as inputs and outputs the prediction mode to be searched as the searching prediction mode information. Further, the mode search unit 610 determines the optimum prediction mode as a searched result and outputs the determined prediction mode as determined prediction mode information.

The cost calculation unit 600 includes a D calculation unit 601, a $\lambda$ calculation unit 602, an R determination unit 603, a multiplier 604, and an adder 605. The D calculation unit 601 uses the prediction error corresponding to the searching prediction mode of the processing target block as an input and calculates and outputs a corresponding pixel value coding cost (corresponding to the above-described D value). The $\lambda$ calculation unit 602 uses the quantization parameter as an input and calculates and outputs the $\lambda$ value.

The R determination unit 603 uses the block size information and the searching prediction mode as inputs and calculates and outputs a coding cost (corresponding to the above-described R value) of the search target prediction mode. In the following description, a search target prediction mode is referred to as a prediction mode candidate accordingly. HEVC has standardized so that a compression ratio is increased when a prediction mode of a coding target block is the same as a prediction mode of an adjacent block. For example, when a prediction mode of a processing target prediction block is the same as a prediction mode of an adjacent block, only a flag indicating whether the prediction mode is the same is coded, and otherwise a difference value between the relevant flag and the prediction mode is coded.

Accordingly, the R determination unit 603 calculates the R value which makes the coding cost when the prediction mode same as that of the adjacent block is the prediction mode candidate smaller compared to the coding cost when the prediction mode different from that of the adjacent block is the prediction mode candidate. Thus, the prediction mode same as that of the adjacent block can be readily selected, and the coding cost of the prediction mode can be reduced.

When the prediction mode being the same as that of the adjacent block is readily selected, it is known that there are some cases in which a prediction error of an image cannot be sufficiently reduced in the image including many small-sized prediction blocks. This is because, it is desirable to perform finer prediction on a less flat and complex image by reducing the prediction block size, however, when the prediction mode same as that of the adjacent block is readily selected, the prediction mode is biased, and sufficient prediction effect cannot be obtained. On the other hand, regarding a large-sized prediction block, the prediction error of the image can be sufficiently reduced even if the prediction mode is biased resulting from that the prediction mode same as that of the adjacent block is readily selected, and thus the above-described issue hardly arises.

Accordingly, the R determination unit 603 calculates the R value based on the prediction mode and the prediction block size. Specifically, the R determination unit 603 adjusts a ratio of the R value when the prediction mode candidate is equal to the prediction mode of the adjacent block to the R value when the prediction mode candidate is not equal to the prediction mode of the adjacent block so as to differ depending on the prediction block size. More specifically, the R determination unit 603 calculates the R value which makes the ratio of the R value when the prediction mode candidate is equal to the prediction mode of the adjacent block to the R value when the prediction mode candidate is not equal to the prediction mode of the adjacent block larger as the prediction block size is smaller. Accordingly, in a highly complex image which includes many small-sized prediction blocks, a bias in the prediction mode is reduced, and high coding efficiency can be obtained as a result.

Figure 7A:
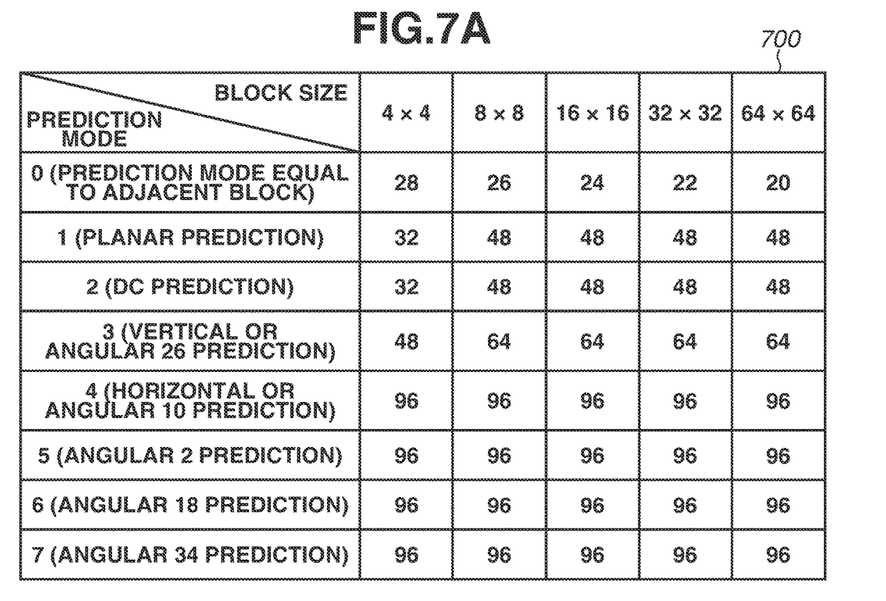
FIGS. 7A and 7B illustrate R value determination processing.
Figure 7B:
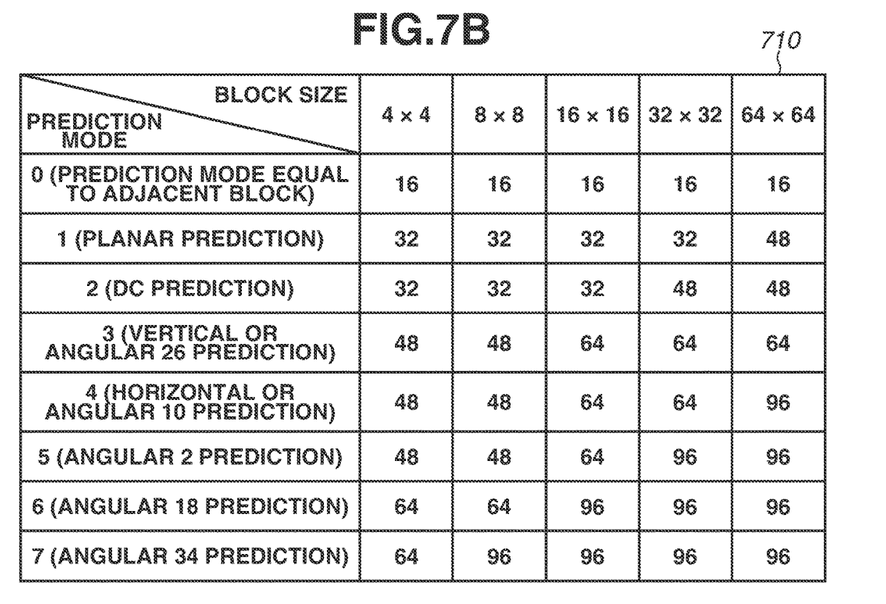

The R determination unit 603 according to the present exemplary embodiment determines the R value based on the prediction mode and the block size by referring to a table. FIGS. 7A and 7B illustrate examples of configurations of tables. In a table 700 in FIG. 7A, combinations of the prediction modes and the block sizes are associated with the values R. FIG. 7B illustrates another example as a table 710. In the both tables 700 and 710, a prediction mode coding cost R corresponding to each of prediction modes 0 to 7 is determined for each prediction block size. The prediction mode 0 represents a mode equal to that of the adjacent block. In the table 700 in FIG. 7A, the R value in the prediction mode 0 (namely, a case when the prediction mode candidate is equal to the prediction mode of the adjacent block) is set to be smaller as the prediction block size is larger.

The table 710 in FIG. 7B is different from the table 700 in FIG. 7A only in the R values. In the table 710, the R values in the prediction mode 0 are the same values in all of the prediction block sizes, and the R values in the prediction modes excepting the prediction mode 0 are set to be changed according to the block size. Accordingly, the prediction mode 0 is less likely to be selected as the prediction block size becomes relatively smaller. In both of the table 700 in FIG. 7A and the table 710 in FIG. 7B, the R value is set so that the smaller R value is determined when the prediction mode candidate is equal to the prediction mode of the adjacent block than when the prediction mode candidate is not equal thereto. Further, in the both tables 700 and 710, a ratio of the R value to the prediction mode of the adjacent block based on the R value to the prediction mode excepting the prediction mode of the adjacent block is set to be smaller as the prediction block size is larger.

The $\lambda$ and R values are multiplied together by the multiplier 604, and the adder 605 outputs a value obtained by adding the D value to the ($\lambda$*R) value as the coding cost. The processing by the cost calculation unit 600 described with reference to FIGS. 6, 7A, and 7B is an example of cost determination processing for determining the coding cost based on the prediction error, the prediction mode candidate, and the prediction block size. The mode search unit 610 determines the prediction mode candidate of which the coding cost is the minimum as the prediction mode with respect to the prediction block. The present processing is an example of mode determination processing for determining the prediction mode based on the coding cost.

Returning to FIG. 3, after the processing in step S303, in step S304, the prediction unit 203 receives a pixel value of the necessary processing target CTU accordingly from the size determination unit 201 and also receives a pixel value of the reconstructed image necessary for generating a prediction value. Subsequently, the prediction unit 203 performs the intra prediction on the processing target CTU based on the prediction block size determined in step S302 and the intra prediction mode determined in step S303 and outputs the prediction error. With that, the intra processing is terminated.

As described above, the moving image coding apparatus 100 according to the first exemplary embodiment determines the coding cost according to not only the prediction error and the prediction mode candidate but also the prediction block size. Accordingly, the moving image coding apparatus 100 can improve the efficiency of the image coding processing in consideration of a block size such as reducing a bias in the prediction mode in a highly complex image which includes many small-sized prediction blocks.

Figure 8:
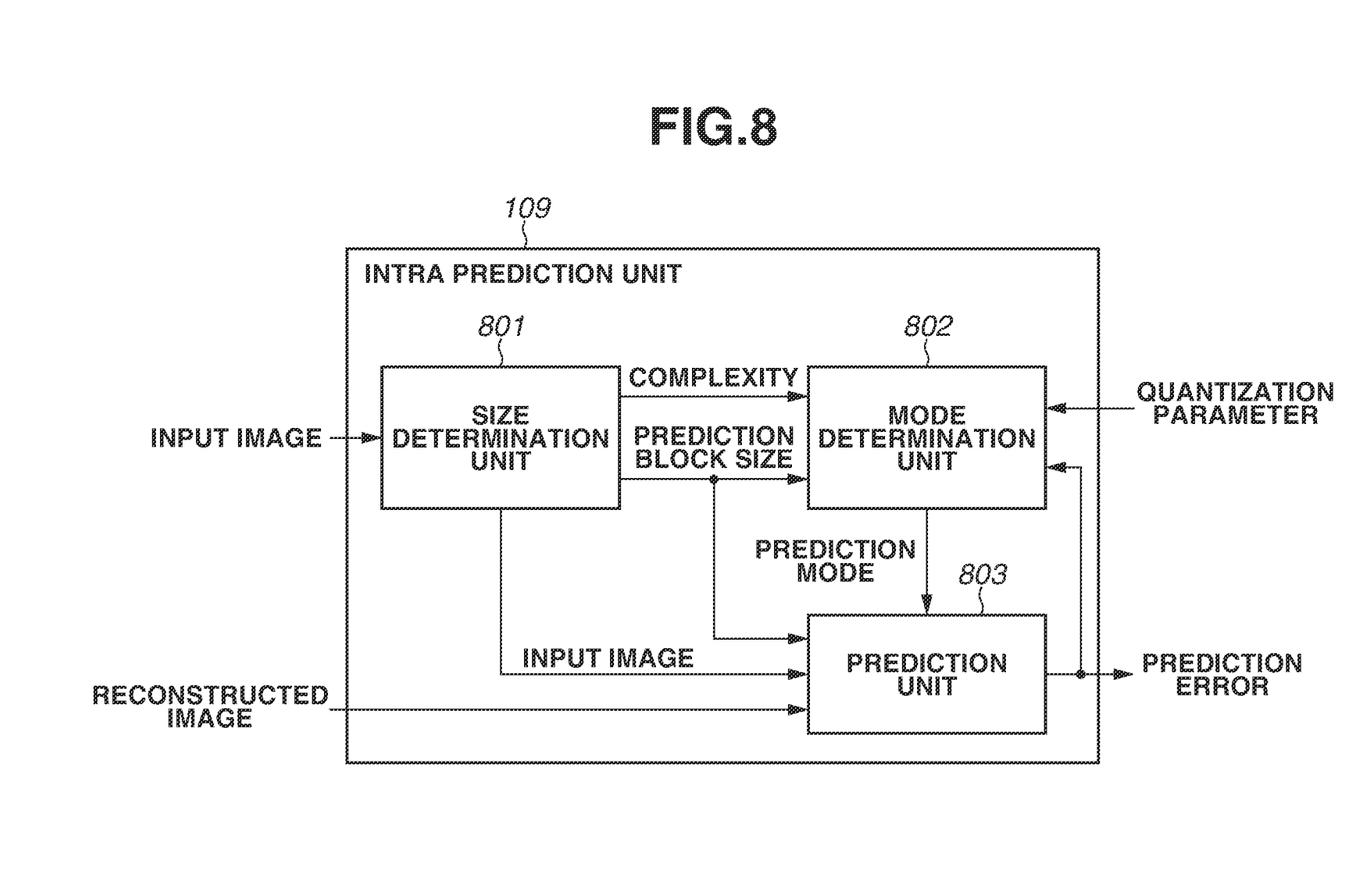
FIG. 8 is a functional block diagram illustrating an intra prediction unit according to a second exemplary embodiment.

Next, a moving image coding apparatus 100 according to a second exemplary embodiment is described focusing on differences from the moving image coding apparatus 100 according to the first exemplary embodiment. FIG. 8 is a functional block diagram illustrating an intra prediction unit 109 in the moving image coding apparatus 100 according to the second exemplary embodiment. The intra prediction unit 109 includes a size determination unit 801, a mode determination unit 802, and a prediction unit 803. The size determination unit 801 is similar to the size determination unit 201 described with reference to FIG. 2, however, further specifies complexity of a sub-block. The complexity is an index value indicating complexity of a processing target image and includes, for example, a dispersion value of a pixel in the processing target image. The present processing is an example of complexity specifying processing.

The mode determination unit 802 determines a prediction mode of a processing target CTU using a quantization parameter and a prediction error output from the prediction unit 803 as inputs based on the prediction block size and the complexity determined by the size determination unit 801. The prediction unit 803 performs prediction processing by accordingly inputting an image from the size determination unit 801 based on the prediction block size determined by the size determination unit 801 and the prediction mode determined by the mode determination unit 802. At this time, the prediction unit 803 is input a reconstructed image of an image coded in the past and uses the reconstructed image as a prediction value. Further, the prediction unit 803 calculates an error between the relevant prediction value and the input image and outputs the error as a prediction error value. The prediction unit 803 is similar to the prediction unit 203 described with reference to FIG. 2.

Figure 9:
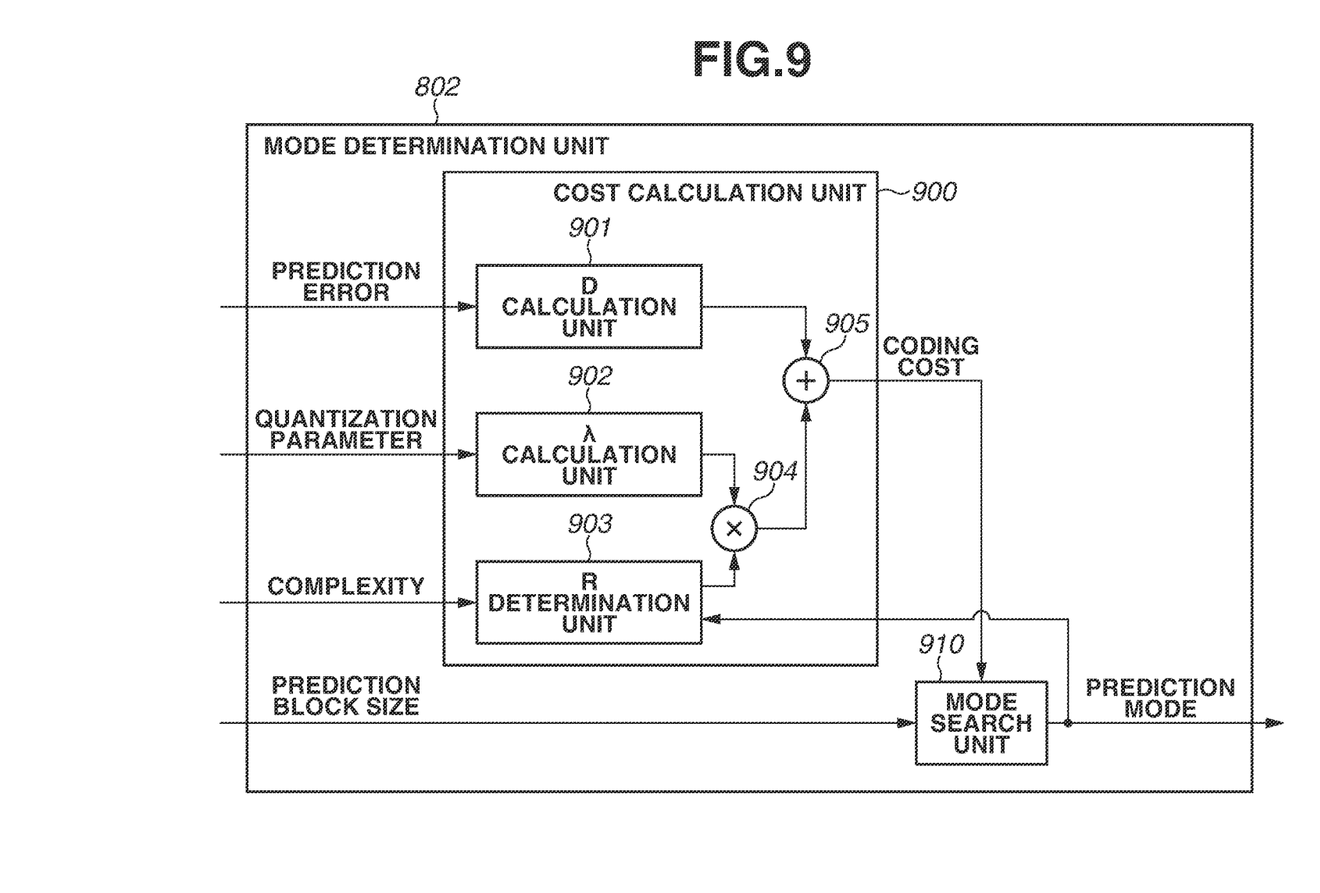
FIG. 9 is a functional block diagram illustrating a mode determination unit.

FIG. 9 is a functional block diagram illustrating the mode determination unit 802. The mode determination unit 802 includes a cost calculation unit 900 and a mode search unit 910. The cost calculation unit 900 uses block size information, the quantization parameter, the prediction error, and a searching prediction mode as inputs and calculates and outputs a coding cost of the corresponding block. The cost calculation unit 900 calculates the coding cost using the function of D+λ*R similar to the cost calculation unit 600 (FIG. 6) according to the first exemplary embodiment. According to the present exemplary embodiment, the R value is calculated according to the complexity and a prediction mode candidate. The cost calculation unit 900 includes a D calculation unit 901, a λ calculation unit 902, an R determination unit 903, a multiplier 904, and an adder 905. The D calculation unit 901 and the λ calculation unit 902 are respectively similar to the D calculation unit 601 and the λ calculation unit 602 according to the first exemplary embodiment described with reference to FIG. 6. The multiplier 904 and the adder 905 are respectively similar to the multiplier 604 and the adder 605 according to the first exemplary embodiment.

The R determination unit 903 calculates the coding cost (R) of the prediction mode based on the complexity and the searching prediction mode. As described above in the first exemplary embodiment, the cost of the prediction mode equal to that of the adjacent block is made smaller in the calculation of the R value. Accordingly, the prediction mode same as that of the adjacent block can be readily selected, and the coding cost of the prediction mode can be reduced. As described above, regarding a less flat and complex image, it is known that there are some cases in which the prediction mode is biased because the prediction mode same as that of the adjacent block is readily selected, and a sufficient prediction effect cannot be obtained.

According to the present exemplary embodiment, the R determination unit 903 calculates the R value according to the prediction mode and the complexity in order to improve the above-described issue. Specifically, the R determination unit 903 calculates the R value which becomes smaller as the complexity is higher. In addition, the R determination unit 603 calculates the R value so that a ratio of the R value when the prediction mode candidate is equal to the prediction mode of the adjacent block to the R value when the prediction mode candidate is not equal to the prediction mode of the adjacent block becomes larger as the complexity is higher. Accordingly, even in a highly complex image which includes many small-sized prediction blocks, a bias in the prediction mode is reduced, and high coding efficiency can be obtained as a result. The configuration and processing of the moving image coding apparatus 100 according to the second exemplary embodiment other than the above-described one are similar to the configuration and processing of the moving image coding apparatus 100 according to the first exemplary embodiment.

Figure 10:
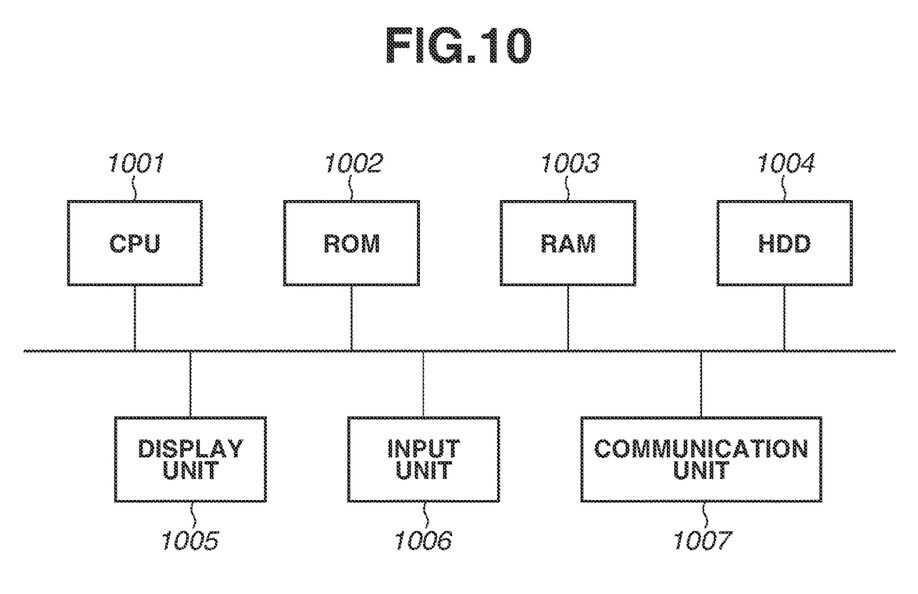
FIG. 10 is a hardware configuration diagram illustrating a moving image coding apparatus.

FIG. 10 is a hardware configuration diagram illustrating the moving image coding apparatus 100 according to the above-described exemplary embodiments. The moving image coding apparatus 100 includes a central processing unit (CPU) 1001, a read only memory (ROM) 1002, a random access memory (RAM) 1003, a hard disk (HDD) 1004, a display unit 1005, an input unit 1006, and a communication unit 1007. The CPU 1001 reads a control program stored in the ROM 1002 and executes various types of processing including the above-described processing. The RAM 1003 is used as a temporary storage area such as a main memory of the CPU 1001 and a work area. The HDD 1004 stores various data pieces, various programs, and the like. The display unit 1005 displays various information pieces. The input unit 1006 includes a keyboard and a mouse and receives various operations by a user. The communication unit 1007 performs communication processing to an external apparatus via a network.

The above-described functions and processing of the moving image coding apparatus 100 are realized by the CPU 1001 reading a program stored in the ROM 1002 or the HDD 1004 and executing the program. As another example, the CPU 1001 may read a program stored in a storage medium such as a secure digital (SD) card instead of the ROM 1002 and others.

As further another example, at least a part of the functions and processing of the moving image coding apparatus 100 may be realized, for example, in cooperation with a plurality of the CPUs, the RAMS, the ROMs, and the storages. As further another example, at least a part of the functions and processing of the moving image coding apparatus 100 may be realized using a hardware circuit.

According to each of the above-described exemplary embodiments, efficiency of image coding processing can be improved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-088532, filed Apr. 27, 2017, which is hereby incorporated by reference herein in its entirety.

What is claimed is:

1. An image coding apparatus which codes an image using intra prediction, the image coding apparatus comprising:
a size determination unit configured to determine a size of a prediction block to be a unit of processing for performing intra prediction;
an intra prediction unit configured to derive a prediction error by performing intra prediction on the prediction block;
a cost determination unit configured to derive a coding cost of a prediction mode in a case where the intra prediction is performed using a reference according to the size determined by the size determination unit and determine the coding cost of the prediction mode based on the coding cost of the prediction mode and the prediction error; and
a mode determination unit configured to determine a prediction mode of the prediction block from among a plurality of prediction modes based on the coding cost.

2. The image coding apparatus according to claim 1, wherein the cost determination unit derives the coding cost using different references according to the size determined by the size determination unit.

3. The image coding apparatus according to claim 1, wherein the mode determination unit determines a prediction mode of which the coding cost is a minimum as a prediction mode of the prediction block.

4. The image coding apparatus according to claim 3, wherein the cost determination unit calculates the coding cost by adding a first value regarding the prediction error to a second value regarding a candidate of the prediction mode, and, in a case where a prediction mode determined to an adjacent block adjacent to the prediction block is selected as the candidate of the prediction mode, further uses a smaller value as the second value than in a case where a prediction mode excepting the prediction mode of the adjacent block is selected as the candidate of the prediction mode.

5. The image coding apparatus according to claim 4, wherein the cost determination unit uses a value as the second value which makes a ratio of the second value in a case where the prediction mode determined to the adjacent block is selected as the candidate of the prediction mode to the second value in a case where a prediction mode different from the prediction mode determined to the adjacent block is selected as the candidate of the prediction mode smaller as a block size of the prediction block is larger.

6. An image coding apparatus which codes an image using intra prediction, the image coding apparatus comprising:
a size determination unit configured to determine a size of a prediction block to be a unit of processing for performing intra prediction;
an intra prediction unit configured to derive a prediction error by performing intra prediction on the prediction block;
a complexity specifying unit configured to specify complexity of the prediction block having the block size determined by the size determination unit;
a cost determination unit configured to derive a coding cost of a prediction mode in a case where the intra prediction is performed using a reference according to the complexity determined by the complexity specifying unit and determine the coding cost of the prediction mode based on the coding cost of the prediction mode and the prediction error; and
a mode determination unit configured to determine a prediction mode of the prediction block from among a plurality of prediction modes based on the coding cost.

7. The image coding apparatus according to claim 6, wherein the cost determination unit derives the coding cost using different references according to the complexity determined by the complexity specifying unit.

8. The image coding apparatus according to claim 6, wherein the mode determination unit determines a prediction mode of which the coding cost is a minimum as a prediction mode of the prediction block.

9. The image coding apparatus according to claim 8, wherein the cost determination unit calculates the coding cost by adding a first value regarding the prediction error to a second value regarding a candidate of the prediction mode, and, in a case where a prediction mode determined to an adjacent block adjacent to the prediction block is selected as the candidate of the prediction mode, further uses a smaller value as the second value than in a case where a prediction mode excepting the prediction mode of the adjacent block is selected as the candidate of the prediction mode.

10. The image coding apparatus according to claim 9, wherein the cost determination unit uses a value as the second value which makes a ratio of the second value in a case where the prediction mode determined to the adjacent block is selected as the candidate of the prediction mode to the second value in a case where a prediction mode different from the prediction mode determined to the adjacent block is selected as the candidate of the prediction mode smaller as the complexity is larger.

11. A method for coding an image using intra prediction, the method comprising:
determining a size of a prediction block to be a unit of processing for performing intra prediction;
deriving a prediction error by performing intra prediction on the prediction block;
deriving a coding cost of a prediction mode in a case where the intra prediction is performed using a reference according to the determined size and determining the coding cost of the prediction mode based on the coding cost of the prediction mode and the prediction error; and
determining a prediction mode of the prediction block from among a plurality of prediction modes based on the coding cost.

12. A method for coding an image using intra prediction, the method comprising:
determining a size of a prediction block to be a unit of processing for performing intra prediction;
deriving a prediction error by performing intra prediction on the prediction block;
specifying complexity of the prediction block having the determined block size;

deriving a coding cost of a prediction mode in a case where the intra prediction is performed using a reference according to the determined complexity and determining the coding cost of the prediction mode based on the coding cost of the prediction mode and the prediction error; and determining a prediction mode of the prediction block from among a plurality of prediction modes based on the coding cost.

13. A non-transitory computer readable storage medium storing a program for causing a computer to function as:
   a size determination unit configured to determine a size of a prediction block to be a unit of processing for performing intra prediction;
   an intra prediction unit configured to derive a prediction error by performing intra prediction on the prediction block;
   a cost determination unit configured to derive a coding cost of a prediction mode in a case where the intra prediction is performed using a reference according to the size determined by the size determination unit and determine the coding cost of the prediction mode based on the coding cost of the prediction mode and the prediction error; and
   a mode determination unit configured to determine a prediction mode of the prediction block from among a plurality of prediction modes based on the coding cost.

14. A non-transitory computer readable storage medium storing a program for causing a computer to function as:
   a size determination unit configured to determine a size of a prediction block to be a unit of processing for performing intra prediction;
   an intra prediction unit configured to derive a prediction error by performing intra prediction on the prediction block;
   a complexity specifying unit configured to specify complexity of the prediction block having the block size determined by the size determination unit;
   a cost determination unit configured to derive a coding cost of a prediction mode in a case where the intra prediction is performed using a reference according to the complexity determined by the complexity specifying unit and determine the coding cost of the prediction mode based on the coding cost of the prediction mode and the prediction error; and
   a mode determination unit configured to determine a prediction mode of the prediction block from among a plurality of prediction modes based on the coding cost.

* * * * *